United States Patent [19]

Drain et al.

[11] Patent Number: 4,717,440
[45] Date of Patent: Jan. 5, 1988

[54] COMPOSITIONS CURABLE BY IN SITU GENERATION OF CATIONS

[75] Inventors: Kieran F. Drain, Meriden, Conn.; David J. Dunn, Aurora, Ohio

[73] Assignee: Loctite Corporation, Newington, Conn.

[21] Appl. No.: 821,570

[22] Filed: Jan. 22, 1986

[51] Int. Cl.$^4$ .................... C08F 4/06; C08G 59/68
[52] U.S. Cl. .................... 156/310; 156/307.3; 156/327; 156/330; 526/144; 526/195; 526/204; 528/88; 528/89; 528/91; 528/93; 528/94; 528/361; 528/408; 528/410
[58] Field of Search .................... 526/144, 195, 204; 528/88, 91, 94, 89, 93, 361, 408, 410; 156/310, 327, 330, 307.3

[56] References Cited

U.S. PATENT DOCUMENTS

| | | | |
|---|---|---|---|
| 4,069,055 | 1/1978 | Crivello | 96/115 R |
| 4,092,296 | 5/1978 | Skiff | 260/47 EP |
| 4,138,255 | 2/1979 | Crivello | 96/35.1 |
| 4,173,551 | 11/1979 | Crivello | 528/91 X |
| 4,238,587 | 12/1980 | Crivello | 526/192 |
| 4,241,204 | 12/1980 | Crivello | 526/195 X |
| 4,283,312 | 8/1981 | Crivello | 528/88 X |
| 4,314,917 | 2/1982 | Wolfrey | 528/91 X |
| 4,342,673 | 8/1982 | Wolfrey | 528/91 X |
| 4,387,216 | 6/1983 | Irving | 528/91 X |
| 4,393,185 | 7/1983 | Berner et al. | 528/88 X |
| 4,396,754 | 8/1983 | Brownscombe | 528/89 |
| 4,447,586 | 5/1984 | Shimp | 528/91 X |
| 4,543,397 | 9/1985 | Woods et al. | 525/455 |
| 4,554,341 | 11/1985 | Allen | 528/88 X |
| 4,581,436 | 4/1986 | Corley | 528/88 X |

FOREIGN PATENT DOCUMENTS 109851  5/1984  European Pat. Off. .

OTHER PUBLICATIONS

H. K. Hall, Jr. and T. Gotoh, "Zwitterionic Tetramethylene Intermediates: A New Interpretation for 'Charge Transfer' Initiation", Polymer Preprints, ACS Div. of Polymer Chemistry, vol. 26, No. 1, pp. 34–35, (1985).

*Primary Examiner*—Earl Nielsen
*Attorney, Agent, or Firm*—Steven J. Hultquist

[57] ABSTRACT

A two-part composition curable by contact of respective parts with one another, comprising: a first part comprising a cationically polymerizable material and a first latent curing component; and a second part comprising a cationically polymerizable material and a second latent curing component which is reactive with the first component to form cations which are curingly effective for the resin. A preferred class of cation species comprises carbenium ions derived from reaction of organic halide compounds, as the first component, with silver salts of non-nucleophilic anions, e.g., $SbCl_6^-$, $SbCl_3^-$, $SbF_6^-$, $AsF_6^-$, $SnCl_5^-$, $PF_6^-$, $BF_4^-$, $CF_3SO_3^-$ and $ClO_4^-$, as the second component. The respective parts of the two-part composition may be applied to matable surfaces which then are contacted to effect rapid bonding cure of the composition.

25 Claims, No Drawings

COMPOSITIONS CURABLE BY IN SITU GENERATION OF CATIONS

BACKGROUND OF THE INVENTION

Field of the Invention

This invention generally relates to compositions comprising cationically polymerizable materials which are curable in a short time, e.g., fixturing in approximately one minute or less and reaching full properties within a short time thereafter, in the manner of cyanoacrylates.

More specifically, the present invention relates to curable compositions comprising cationically polymerizable materials wherein rapid cure is achieved by the in situ generation of cations, which function as catalytic species for the cure of such materials, and to two-component adhesive compositions which in use are applied one component to each of two matable surfaces with rapid cure occurring on mating of the surfaces.

Description Of The Related Art

As discussed in our copending U.S. patent application Ser. No. 669,189, filed Nov. 7, 1984 and now issued as U.S. Pat. No. 4,565,837, a major disadvantage of prior art fast cure epoxies curable at room temperature conditions, e.g., mercaptan cured epoxies, is that rapid gellation of such materials retards the development of full properties due to the restriction of molecular motion and the cure mechanism involved. Extremely fast cures in these compositions result in overly plasticized products due to the need to use a high level of the curative component. Further, for conventional amine- or mercaptan-cured epoxies, there is a critical mix ratio or stoichiometry for the epoxy resin/curing agent (hardener) mixture, with thorough mixing necessary to achieve full cure.

In the aforementioned copending patent application, we have described storage stable dispersions of stable carbocation salts as initiators for polymerizing epoxy resins to high molecular weight solids. Specifically disclosed in such application are two-part adhesive compositions of a type exhibiting rapid room temperature cure, which in a first part comprise an oxirane functional resin and in a second part comprise a stable carbenium ion salt, i.e., a triphenylmethyl or tropylium salt in a suitable carrier.

In epoxy compositions of the type exemplified in the above-described application, carbocation initiators cause spontaneous epoxy polymerization and thus generally are dispersed in an unreactive carrier; as such, the respective components require thorough mixing to produce a homogeneous polymeric solid. In many instances, the requirement of such thorough mixing is at odds with the rapid cure nature of the composition, and may result in premature fixturing of the composition prior to its application to the desired substrate.

Illustrative of the prior art usage of other curing agents which effect spontaneous polymerization when mixed with a separate epoxy resin component are U.S. Pat. No. 4,396,754, which teaches an epoxy curing catalyst selected from lithium or Group II metal salts of a non-nucleophilic acid, including $LiBF_4$, $Ca(BF_4)_2$, $Mg(BF_4)_2$, $LiPF_6$, $Ca(PF_6)_2$, $Mg(PF_6)_2$, $LiSbF$, $LiAsF_6$ and the like, and U.S. Pat. No. 4,092,296, which teaches to utilize metallic fluoroborate salts, e.g., salts of tin, copper, zinc, nickel, lead and silver, in aqueous solution as epoxy curing agents. See also U.S. Pat. Nos. 4,069,055 and 4,138,255 to J. V. Crivello which disclose the cationic polymerization of epoxy resins by radiation sensitive aromatic onium salts of Group VA and VIA.

The aforementioned U.S. Pat. No. 4,092,296 teaches the use of silver tetrafluoroborate but shows it by example to be a poor single catalyst (Examples 192–197; see column 23, line 51–column 24, line 22). All other metallic salts disclosed in U.S. Pat. Nos. 4,396,754 and 4,092,296 are characterized by short shelf lives due to their activity as single catalysts, i.e., their spontaneous high reactivity with epoxy resins.

Accordingly, it would be a substantial advance in the art to provide an epoxy adhesive composition wherein the catalyst, i.e. hardening agent, is generated in situ in a manner facilitating the application of the composition to the substrate materials without premature curing.

It therefore is an object of the present invention to provide a composition comprising a cationically polymerizable material, e.g., an oxirane functional resin, which is rapidly cured and reaches full properties in a short time, but does not require the complete mixing of components in the manner of prior art two-part epoxy resin systems.

It is another object of the present invention to provide a cationically polymerizable resin composition comprising two parts, wherein each part contains an integral component of the catalyst system for the resin.

Other objects and advantages of the present invention will be apparent from the ensuing disclosure and appended claims.

SUMMARY OF THE INVENTION

In one aspect, the present invention relates to a two-part composition curable by contact of respective parts with one another, comprising: a first part comprising a cationically polymerizable material and a first latent curing component; and a second part comprising a cationically polymerizable material and a second latent curing component which is reactive with the first component to form cations which are curingly effective for the cationically polymerizable material.

Another aspect of the present invention relates to compositions of the aforementioned type, wherein the cations are formed by addition reaction of the first and second latent curing components.

Another aspect of the present invention relates to compositions of the aforementioned type, wherein the cations are formed by dissociation of the first component in reaction with the second component.

Still another aspect of the invention relates to a composition of the above type, wherein the first component is an organic halide and the second component is a silver salt of a non-nucleophilic anion selected from the group consisting of: $SbCl_6^-$, $SbCl_3^-$, $SbF_6^-$, $AsF_6^-$, $SnCl_5^-$, $PF_6^-$, $BF_4^-$, $CF_3SO_3^-$, $ClO_4^-$.

A further aspect of the invention relates to a two-part composition curable by contact of respective parts with one another, comprising:

a first part comprising an oxirane functional resin and an organic halide of the formula:

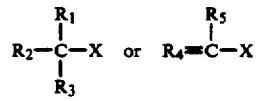

wherein: $R_1$, $R_2$, $R_3$ and $R_5$ may be the same or different and each independently is selected from h, halo, alkyl, aryl, aralkyl, alkaryl, and alkenyl, which may optionally be substituted by alkyl, alkenyl, halo, or cyano; $R_4$ is selected from alkylidene, aralkylidene, and alkenylidene, which may optionally be substituted by alkyl, alkenyl, halo, or cyano; and X is halo; and a second part comprising an oxirane functional resin and a compound which is reactive with the organic halide to form cations which are curingly effective for the resin.

A still further aspect of the present invention relates to a two-part composition curable by contact of respective parts with one another, comprising: a first part comprising an oxirane functional resin and an organic halide; and a second part comprising an oxirane functional resin and a silver salt of a non-nucleophilic anion.

In another aspect, the present invention relates to a method of producing cured compositions from the aforementioned two-part compositions, comprising contacting the respective first and second parts thereof with one another.

In yet another aspect, the present invention relates to a method of bonding matable surfaces to one another, wherein the first part of the aforementioned two-part compositions is applied to a first matable surface and the second part of such compositions is applied to a second matable surface, and the first and second matable surfaces are mated to contact the respective first and second parts applied thereto.

DETAILED DESCRIPTION OF THE PREFERRED EMBODIMENTS

Cationically polymerizable materials which may be cured or polymerized by the cationic species formed by reaction of the first and second latent curing components when present in a curingly effective amount, include all suitable materials capable of undergoing cationic polymerization in the presence of such cations as, for example: oxiranes; styryloxy compounds; vinyl ethers; N-vinyl compounds; ethylenically unsaturated hydrocarbons; cyclic formals and cyclic organosiloxanes. Illustrative materials of such types are described in European patent application No. 109,851 of M. C. Palazzotto, et al, published May 30, 1984.

Preferred cationically polymerizable materials useful in the broad practice of the present invention include: styryloxy compounds, as for example described in U.S. Pat. No. 4,543,397 of J. Woods, et al; vinyl ethers, including those described in copending U.S. application Ser. No. 600,627, now U.S. Pat. No. 4,575,544 of John Rooney and Paul Conway; and oxiranes, as described below.

As used herein, the terms "oxirane" and "oxirane functional resin" refer to organic compounds having at least one oxirane ring or epoxide (epoxy) group which is polymerizable by ring opening. Such materials generally have at least one polymerizable epoxy group per molecule, preferably two or more such groups per molecule and in the case of polymeric epoxies numerous pendant epoxy groups. Molecular weight of oxirane functional resins useful in the general practice of the present invention may range from about 50 to about 100,000 or higher. Further, it is within the purview of the present invention to utilize mixtures of various oxirane functional resins in the compositions of the invention. Useful oxirane functional resins are described in "Handbook of Epoxy Resins", Lee and Neville, McGraw Hill Book Company, New York, 1967, and in "Epoxy Resins Chemistry and Technology", May and Tanake, Marcel Dekker Inc., New York, 1973, and include cycloaliphatic epoxies, epoxidized novolacs, diglycidyl ethers of bisphenol-A, i.e., resins resulting from bisphenol-A (4,4'-isopropylidene diphenol) and epichlorohydrin, and extended prepolymers of diglycidyl ethers of bisphenol-A. Epoxy resins particularly useful in the invention include those which contain one or more cyclohexene oxide groups per molecule, such as the epoxycyclohexane carboxylates. Examples of such epoxies include 3,4-epoxycyclohexylmethyl-3,4-epoxycyclohexane-carboxylate, bis (3,4-epoxy-6-methylcyclohexyl-methyl)adipate, vinylcyclohexene dioxide, and 2,(3,4-epoxycyclohexyl-5-5,-spiro-3,4-epoxy)cyclohexane metadioxane.

As used herein, the term "silver salt of a non-nucleophilic anion" refers to silver salts of non-nucleophilic acids, suitable non-nucleophilic acids being those which (i) in a 10% by weight water solution have a pH of less than 1.0, and (ii) comprise an anion portion which does not easily participate in displacement reactions with organic halides.

As used herein, the term "carbenium ion" refers to a carbocation species, i.e., an ion containing carbon having a sextet of electrons, as for example, carbocations of the formula;

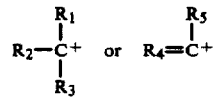

wherein: $R_1$, $R_2$, $R_3$ and $R_5$ may be the same or different and each independently is selected from H, halo, alkyl, aryl, aralkyl, alkaryl, and alkenyl, which may optionally be substituted by alkyl, alkenyl, halo, or cyano; and $R_4$ is selected from alkylidene, aralkylidene, and alkenylidene, which may optionally be substituted by alkyl, alkenyl, halo, or cyano.

The composition of the present invention overcomes the constraint of complete mixing requirements associated with cationically cured formulations of the prior art, e.g., epoxy adhesives, which as indicated hereinearlier is frequently at odds with the spontaneous rapid cure character of these formulations, by providing in situ generation of cations which are curingly effective for the cationically polymerizable material. As used herein the term "curingly effective" in reference to cations generated by contacting respective parts of the two-part compositions of the present invention, means that the cationically polymerizable material is at least partially polymerized in the presence of such cations, e.g., in the case of oxirane functional resins, the resin in the presence of such cations is polymerized by ring opening of oxirane ring (epoxide) groups.

The curingly effective cations which are useful in the broad practice of the present invention generally include all suitable cationic species which are curingly effective for the specific cationically polymerizable material utilized in the composition, and may comprise carbenium ions, zwitterions, protons, hydronium ions, or any other positive ions which are useful for the intended purpose. It is to be appreciated that the electrochemical mechanism(s) of the cation formation and the curing of the cationically polymerizable material thereby may include concurrent and/or sequential formation of various cationic species which directly or indirectly effect or culminate in curing of the cationically polymerizable material. It is therefore intended that the term "cations" and "curingly effective cations" as used herein be broadly construed to embrace all such cationic curing mechanisms useful for cure polymerization of cationically polymerizable materials in the compositions of the present invention.

The curingly effective cations are formed by reaction of the first latent curing component, contained in the first part of the composition, and the second latent curing component, contained in the second part of the composition. One useful reaction mechanism for forming such cations is addition reaction of the first and second latent curing components upon contacting of the respective first and second parts of the composition with one another. Another suitable reaction mechanism comprises dissociating the first latent curing component in reaction with the second latent curing component, when the respective first and second parts of the composition are contacted with one another.

In compositions in which the curingly effective cations are formed by addition reaction of the first and second latent curing components, the first and second components each may be present in amounts of from about 0.05 to about 10% by weight, based on the total weight of the composition (inclusive of both parts when the composition is in the form of a two-part formulation), and preferably from about 1 to about 5% by weight, based on the total weight of the composition.

The source of curingly effective cations in the compositions of the present invention may include any latent curing components which are generally compatible with the cationically polymerizable materials used in the composition and which react with each other to form the curingly effective cations. Thus, the respective cation-forming components function in the system as co-catalysts relative to one another.

The formation of curingly effective cations by addition reaction of the first and second latent curing components may suitably comprise the formation of zwitterions as the cationic species, by charge transfer initiation reaction, e.g., reaction of a nucleophilic olefin and an electrophilic olefin, such as is described in "Zwitterionic Tetramethylene Intermediates: A New Interpretation For 'Charge-Transfer' Initiation", by H. K. Hall, Jr., and T. Gotoh, Polymer Preprints, ACS Division of Polymer Chemistry, Vol. 26, No. 1, pp. 34–35 (1985).

A particularly preferred nucleophilic/electrophilic olefin pair, wherein the nucleophilic olefin is one of the latent curing components in one of the respective parts of the composition and the electrophilic olefin is the other latent curing component in the other part of the composition, comprises as the nucleophilic olefin an ethylenically unsaturated carbazole and as the electrophilic olefin a compound having a nitrile functionality of at least two. The carbazole may for example be N-vinyl carbazole, and the nitrile functional olefin may for example by 2,2-dicyanovinyliodide, tetracyanoethylene, or 2,2-dicyanoethylene-1,1-dicarboxylate.

As indicated, another preferred reaction mechanism for forming the curingly effective cations is dissociation of the first latent curing component in reaction with the second latent curing component, the latter functioning in such co-catalyst system as a dissociation promoter component, i.e., the second component is dissociatingly effective for the first component, causing it to dissociate to form the curingly effective cations.

When dissociation reaction provides the curingly effective cations, the composition of the present invention may be utilized in the form of a two-part composition curable by contact of respective parts with one another, comprising a first part including a cationically polymerizable material and the cation-forming compound, i.e., a first compound dissociatable to form cations which are curingly effective for the material, and a second part including a cationically polymerizable material and the dissociation promoting compound, i.e., a second compound which is reactive with the first compound to cause the first compound to be dissociated to form the curingly effective cations.

Illustrative of useful dissociatable cation source components are organic halides, which may be dissociated by co-catalyst components reacting therewith to complex or otherwise precipitate the halide moiety of the compound, and water or aqueous media, which may be dissociated to form hydronium ions and/or protonic catonic species effective for curing the cationically polymerizable material.

Illustrative organic halides which have been found to be particularly useful in the practice of the present invention include, but are not limited to, halo compounds of the formula:

$$R_2-\underset{\underset{R_3}{|}}{\overset{\overset{R_1}{|}}{C}}-X \quad \text{or} \quad R_4-\overset{\overset{R_5}{|}}{C}-X$$

wherein: $R_1$, $R_2$, $R_3$ and $R_5$ may be the same or different and each independently is selected from H, halo, alkyl, aryl, aralkyl, alkaryl, and alkenyl, which may optionally be substituted by alkyl, alkenyl, halo, or cyano; $R_4$ is selected from alkylidene, aralkylidene, and alkenylidene, which may optionally be substituted by alkyl, alkenyl, halo, or cyano; and X is halo.

Preferred compounds of the foregoing formula include those wherein $R_1$, $R_2$, $R_3$ and $R_5$ are independently selected from —H, —CH$_3$, C$_3$H$_7$—, C$_6$H$_5$—,

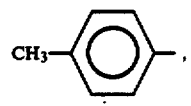

and CH$_2$=CH—.

Specific preferred compounds include (C$_6$H$_5$)$_3$CX, (C$_6$H$_5$)$_2$CHX, XH$_2$C(C$_6$H$_4$)CH$_2$X, C$_3$H$_7$CH$_2$X, (CN)$_2$C=CHX, C$_6$H$_5$CH$_2$X, pCH$_3$C$_6$H$_4$CH$_2$X, (CH$_3$)$_3$CX, (CH$_3$)$_2$CHX, CH$_2$=CH—CH$_2$X, and most preferred halo compounds include dibromoxylene and iodobutane.

The concentration of the halo compound in the composition of the present invention may suitably range from about 0.05 to about 10% by weight, based on the total weight of the composition (inclusive of both parts when the composition is in the form of a two-part formulation), and preferably from about 1 to about 5%, by weight, based on the total weight of the composition.

The dissociation promoting compound utilized in compositions of the present invention in combination with the aforementioned dissociatable cation source components may comprise any suitable compound which is generally compatible with the cationically polymerizable material and which is reactive with the cation-forming compound to cause such compound to be dissociated to form the curingly effective cations.

Illustrative of useful dissociation promoting compounds are silver salts of non-nucleophilic anions. Non-nucleophilic anions, which are potentially useful in such silver salts in the broad practice of the present invention include, but are not limited to, $SbCl_6^-$, $SbCl_3^-$, $SbF_6^-$, $AsF_6^-$, $SnCl_5^-$, $PF_6^-$, $BF_4^-$, $CF_3SO_3^-$, $ClO_4^-$.

Such silver salt compounds may be used at any suitable concentration effective to dissociate the cation-forming compound, however in the general practice of the invention concentrations on the order of from about 0.05 to about 10% by weight, based on the total weight of the composition (inclusive of both parts when the composition is in the form of a two-part formulation) have been found to be useful, with concentrations of the silver salt on the order of from about 1 to about 5% by weight, based on the total weight of the composition, being preferred.

As illustrative of compositions of the present invention utilizing various of the aforementioned exemplary first and second latent curing components, the cationically polymerizable composition may contain components which react to form zwitterionic species as the curingly effective cations by charge transfer catalysis, e.g., by reaction of a carbazole such as N-vinylcarbazole with an organic (olefinic) halide such as 2,2-dicyanovinyliodide. Alternatively, curingly effective cations may be formed in situ in the cationically polymerizable composition by use of moisture as a cocatalyst in combination with silver salts of non-nucleophilic anions; for example, the silver salt-containing resin composition may be coated on matable surfaces to be bonded to one another, whereby atmospheric moisture condensed on the surfaces of the bonding substrates causes formation of hydronium ions and/or protons to cure the cationically polymerizable resin.

Exemplary preferred compositions of the present invention utilize an organic halide in an oxirane functional resin-containing first part of the composition, wherein the organic halide serves as the compound dissociable to form cations which are curingly effective for the resin, in combination with a silver salt of a non-nucleophilic anion, as the dissociation-promoting compound in a second oxirane functional resin-containing part of the composition.

The mechanism of forming curingly effective cations in such preferred oxirane functional resin compositions of the present invention, wherein silver salts of non-nucleophilic anions are reacted with organic halides, involves the precipitation of silver halide with the concomitant formation of carbocationic species, e.g., carbenium ions, from the organic moiety of the organic halide compound. The kinetic rate of the silver halide formation reaction is sufficiently fast to maintain an extremely high concentration driving force for the carbocation formation, resulting in a high rate of cure when the silver salt-containing part of the composition is brought into contact with the organic halide-containing part of the composition.

In the composition of the present invention, each of the respective first and second parts, i.e., the first part comprising a cationically polymerizable material and first latent curing component, and the second part comprising a cationically polymerizable material and second latent curing component, may suitably comprise a solvent for the co-catalyst component therein. The solvents in the respective parts of the composition may be the same or different depending on the specific first and second latent curing components employed, however, it is generally preferred in practice to utilize the same solvent in each part of the composition, for reasons of compatibility of the respective parts with one another.

The solvents utilized in the composition will generally have a concentration in the respective parts which is from about 1 to about 4 times the concentration of the catalyst, e.g., silver salt or organic halide component, in such part.

Suitable solvents for the composition generally include polar solvents, e.g., anhydrous alcohols such as ethanol, tetrahydrofuran, nitromethane, and some ketones, ethers and esters. Preferably the solvent is non-volatile, non-nucleophilic and substantially moisture-free.

In like manner, any liquid vehicles employed in the composition, or in respective parts thereof, for extending the composition or its parts, are preferably non-nucleophilic in character and substantially moisture-free. Suitable vehicles of such type include polyepichlorohydrin, polybutenes, hydroxy terminated polybutadienes, carboxy terminated polybutadienes, polyglycols and polyglycol esters.

The cationically polymerizable composition of the present invention, or the respective parts thereof, may suitably comprise any additives conventionally used in cationically polymerizable formulations which do not oppose or prevent in situ formation of curingly effective cations. Illustrative of such additives are fillers, pigments, stabilizers, antioxidants, moisture scavengers, etc. Since alkaline materials retard or inhibit cationic curing, the additives utilized in compositions according to the present invention preferably are non-alkaline or acidic in character. As used in such context, in particular reference to fillers, such non-alkaline or acidic character refers to acidity such as may usefully be determined by ASTM test D 1208-7.8. Since co-catalyst materials such as silver salts of non-nucleophilic anions and carbazoles such as N-vinylcarbazole are highly moisture-sensitive, any additives in compositions of the invention wherein such co-catalyst materials are utilized should have a low moisture content, preferably less than 0.5% by weight of such additive and most preferably less than about 0.1% by weight. Suitable fillers may include anhydrous aluminum silicates, anhydrous calcium silicates, Barytes, kaolin, powdered aluminum, and amorphous silica, e.g., Imsil 54.

The compositions of the present invention are highly advantageous in adhesive applications, and exhibit fixturing times on the order of approximately one minute or less, i.e., when the respective parts of the composition are contacted, the aforementioned fixture times are achieved, with the composition reaching its full properties in a short time thereafter in the manner of cyanoacrylates.

In the use of the two-part composition of the present invention as an adhesive bonding medium, the respective parts may each be applied to a corresponding matable surface, with rapid cure occurring on mating of the surfaces as the respective parts of the composition are brought into contact with one another. The curing mechanism is cationic in character, with the catalytic species, i.e., curingly effective cations, being generated in situ on diffusion mixing of the respective components. Thus, in such separately applied and subsequently contacted two-part compositions, the composition is cured by cations generated in the bond line at the interface between respective parts. For example, in a composition utilizing a first part comprising an oxirane functional resine and a silver salt of a non-nucleophilic anion, and a second part comprising an oxirane functional resin and an organic halide compound, carbenium ions are generated at the bond line by cross-diffusion of organic halide molecules countercurrent to diffusion of the silver salt molecules. Preferably, the cationically polymerizable material in the first part of the composition is the same as the cationically polymeriable material in the second part of the composition, and the concentration of cationically polymerizable material in each of the first and second parts is the same, whereby cross-diffusional concentration driving forces of the first and second latent curing components are maximized, i.e., there is no cross-diffusion of cationically polymerizable material between the respective parts, such as may otherwise interfere with diffusion of the respective cocatalyst components.

Each of the respective parts of the two-part composition of the present invention, utilized as a so-called "two-package system", is highly stable in character, with a shelf life which may be on the order of two months or more, yet on contacting of the respective parts, curing occurs at a rapid rate, e.g., fixturing within one minute and obtension of full properties within one-to-two hours, at ambient (room temperature) conditions.

Although the composition of the present invention has been referred to as a two-part composition, it will be appreciated that in some instances it may be desirable to utilize additional components or parts with the specific first and second parts described illustratively hereinabove, and accordingly the term "two-part composition" as used herein is intended to be broadly construed to include all such formulations wherein further parts or components are utilized. In preferred practice, however, compositions utilizing only two parts are desirable, to facilitate application and packaging of the composition.

The features and advantages of the present invention are more fully illustrated with reference to the following non-limiting Examples, wherein all parts and percentages are by weight, unless otherwise expressly stated.

EXAMPLE I

A two-part adhesive composition as described in Table I below was prepared, utilizing as the oxirane functional resin a cycloaliphatic resin, CY 179 epoxy (commercially available from Ciba Geigy Corporation, Ardsley, N.Y). Part A was applied to one test substrate and Part B to a second substrate. On mating of the two substrates, an adhesive bond capable of handling a 3 kg load was formed within seconds. The test substrates were one inch by four inch mild steel lapshear specimens, solvent wiped, and the bond area was one square inch. Fixture time and the ultimate strength developed by the composition, as measured by ASTM D 1002-64, are set forth in Table II below.

TABLE I

| Component | Formulation Concentration, wt. % |
|---|---|
| Part A | |
| Oxirane functional resin | 97.0 |
| Silver Hexafluoroantimonate | 1.0 |
| Anhydrous Ethanol | 2.0 |
| Part B | |

TABLE I-continued

| Component | Formulation Concentration, wt. % |
|---|---|
| Oxirane functional resin | 98.0 |
| Dibromoxylene | 1.0 |
| Tetrahydrofuran | 1.0 |

TABLE II

| Tensile Shear Strength | 1200 psi |
|---|---|
| Fixture Time | 20 seconds |

This Example, utilizing dibromoxylene as a carbenium ion-forming compound, in combination with a silver salt of a non-nucleophilic anion, silver hexafluoroantimonate, as a dissociation-promoting compound, shows that complete mixing of the respective parts of the composition, in the manner of prior art formulations, is not required and that simple contact involving diffusional mixing of the co-catalyst compounds, i.e., the organic halide and silver salt, is adequate to produce a high strength bond within a short time after the respective parts of the composition are contacted.

EXAMPLE II

The shelf life of silver salt catalysed epoxy resins is significantly enhanced by drying the epoxy resin, since, as described above, water can act as a co-catalyst with the silver salt. This Example describes a preferred embodiment of the invention having good shelf life characteristics.

A two-part adhesive composition as described in Table III below was prepared utilizing the same oxirane functional resin as in Example I. This epoxy resin was initially treated with 10 phr of a drying agent, Mobay Zeolith L paste (Mobay Chemical Company) for 24 hours, following which the resin was centrifuged and the nascent liquid used in the preparation of the composition.

Parts A and B were respectively applied to two matable substrates as described in Example I, and upon mating of the substrates, rapid bonding was observed. Tensile shear strength and fixture time values were determined, as set forth in Table IV below.

Stability of Part A in a high density polyethylene container was determined to be in excess of two months.

TABLE III

| Component | Formulation Concentration, wt. % |
|---|---|
| Part A | |
| Oxirane functional resin | 92.0 |
| Silver Hexafluoroantimonate | 2.0 |
| Anhydrous Ethanol | 6.0 |
| Part B | |
| Oxirane functional resin | 92.0 |
| Dibromoxylene | 2.0 |
| Tetrahydrofuran | 6.0 |

TABLE IV

| Tensile Shear Strength | 1200 psi |
|---|---|
| Fixture Time | 45 seconds |

EXAMPLE III

To demonstrate the utility of a composition of the present invention utilizing a filler material therein, the two-part adhesive composition described in Table V below was prepared utilizing the same oxirane functional resin as in Example I, and as the filler HDKH20 silica, commercially available from Wacker Chemie AG, Munich, West Germany. The respective parts likewise were applied to corresponding test substrates in the manner described in Example I. Rapid bonding was achieved and a tensile shear strength of 1020 psi was measured for the bonded substrates.

TABLE V

| Component | Formulation Concentration, wt. % |
|---|---|
| Part A | |
| Oxirane functional resin | 93.0 |
| Silver Hexafluoroantimonate | 1.0 |
| Anhydrous Ethanol | 1.0 |
| Silica | 5.0 |
| Part B | |
| Oxirane functional resin | 91.0 |
| Dibromoxylene | 2.0 |
| Tetrahydrofuran | 2.0 |
| Silica | 5.0 |

EXAMPLE IV

This Example illustrates a composition according to the present invention wherein a polymeric additive, polymethylmethacrylate, is utilized for thickening and reinforcement of the composition.

The composition described in Table VI below was made up utilizing as the oxirane functional resin the epoxy resin of Example I. Respective parts of the composition were applied to corresponding substrates which were mated, in accordance with the procedure of Example I. The tensile shear strength measured was 1133 psi.

TABLE VI

| Component | Formulation Concentration, wt. % |
|---|---|
| Part A | |
| Oxirane functional resin | 82 |
| Polymethylmethacrylate | 10 |
| Silver Hexafluoroantimonate | 2 |
| Anhydrous Ethanol | 6 |
| Part B | |
| Oxirane functional resin | 86 |
| Polymethylmethacrylate | 10 |
| Dibromoxylene | 2 |
| Tetrahydrofuran | 2 |

EXAMPLE V

A two-part adhesive composition as described in Table VII below was prepared, using as the oxirane functional resin a hydrogenated bisphenol-A resin, Epi-Rez 50861, commercially available from Celanese Corporation, New York, N.Y. The respective parts were applied to test substrates and the bonded substrates were evaluated for tensile shear strength in the manner of Example I. Tensile shear strength measured for the sample was 890 psi.

TABLE VII

| Component | Formulation Concentration, wt. % |
|---|---|
| Part A | |
| Oxirane functional resin | 92 |
| Silver Hexafluoroantimonate | 2 |
| Anhydrous Ethanol | 6 |
| Part B | |
| Oxirane functional resin | 96 |
| Dibromoxylene | 2 |
| Tetrahydrofuran | 2 |

EXAMPLE VI

To illustrate the use of inorganic mineral fillers in compositions of the present invention, the two-part adhesive composition as described in Table VIII below was prepared, Part A utilizing a 4:1 ratio of Barytes and magnetite as fillers, and Part B utilizing Optiwhite P (commercially available from Burgess Pigment Company, Sandersville, Ga.) as the filler. The same oxirane functional resin as in Example I was employed. Respective parts of the composition were applied to corresponding test substrates and tensile shear strength of the resulting bond was determined, in the manner of Example I. The tensile shear strength value measured for the sample was 847 psi.

TABLE VIII

| Component | Formulation Concentration, wt. % |
|---|---|
| Part A | |
| Oxirane functional resin | 46 |
| Barytes | 40 |
| Magnetite | 10 |
| Silver Hexafluoroantimonate | 1 |
| Anhydrous alcohol | 3 |
| Part B | |
| Oxirane functional resin | 72 |
| Optiwhite P | 25 |
| Dibromoxylene | 1.5 |
| Tetrahydrofuran | 1.5 |

EXAMPLE VII

A two-part adhesive composition was prepared, as described in Table IX below. The oxirane functional resin utilized in each of Parts A and B was Stauffer E 8202-T29 resin (Stauffer Chemical Company, Westport, Conn.), a rubber-modified diglycidyl ether of bisphenol-A. Aluminum powder was utilized as a metallic filler in each of the parts of the composition. The respective parts were applied to corresponding test substrates which were mated and tensile strength was determined as in Example I. The measured tensile shear strength value was 1075 psi.

TABLE IX

| Component | Formulation Concentration, wt. % |
|---|---|
| Part A | |
| Oxirane functional resin | 72 |
| Silver Hexafluoroantimonate | 2 |
| Tetrahydrofuran | 6 |
| Aluminum Powder | 20 |
| Part B | |
| Oxirane functional resin | 72 |
| Dibromoxylene | 2 |
| Tetrahydrofuran | 6 |

TABLE IX-continued

| Component | Formulation Concentration, wt. % |
|---|---|
| Aluminum Powder | 20 |

EXAMPLE VIII

A two-part adhesive composition as described in Table X below was prepared, using the same oxirane functional resin in both parts as in Example I. Iodobutane was employed as the organic halide in Part B. Tensile shear strength and fixture time were determined for this composition in the same manner as Example I, yielding the results shown in Table XI below.

TABLE X

| Component | Formulation Concentration, wt. % |
|---|---|
| Part A | |
| Oxirane functional resin | 98.0 |
| Silver Hexafluoroantimonate | 0.6 |
| Anhydrous ethanol | 1.4 |
| Part B | |
| Oxirane functional resin | 98.0 |
| Iodobutane | 1.0 |
| Tetrahydrofuran | 1.0 |

TABLE XI

| Tensile Shear Strength | 1300 psi |
|---|---|
| Fixture Time | 25 seconds |

Although preferred embodiments of the present invention have been described in detail, it will be appreciated that other variants, modifications and embodiments are possible, and accordingly, all such apparent variants, modifications and embodiments are to be regarded as being within the spirit and scope of the present invention.

What is claimed is:

1. A two-part composition curable by contact of respective parts with one another, comprising:
   a first part comprising a cationically polymerizable material and a first latent curing component selected from the group consisting of organic halides and water;
   a second part comprising a cationically polymerizable material and a second latent curing component which is reactive with said first component to form cations which are curingly effective for said cationically polymerizable material.

2. A composition according to claim 1, wherein said second component is a silver salt of a non-nucleophilic anion.

3. A composition according to claim 2, wherein said non-nucleophilic anion is selected from the group consisting of: $SbCl_6^-$; $SbCl_3^-$; $SbF_6^-$; $AsF_6^-$; $SnCl_5^-$; $PF_6^-$; $BF_4^-$; $CF_3SO_3^-$; and $ClO_4^-$.

4. A two-part composition curable by contact of respective parts with one another, comprising:
   a first part comprising a cationically polymerizable material and as a first latent curing component an organic halide of the formula:

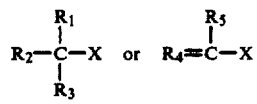

wherein:
   $R_1$, $R_2$, $R_3$ and $R_5$ may be the same or different and each independently is selected from H, halo, alkyl, aryl, aralkyl, alkaryl, and alkenyl, which may optionally be substituted by alkyl, alkenyl, halo, or cyano;
   $R_4$ is selected from alkylidene, aralkylidene, and alkenylidene, which may optionally be substituted by alkyl, alkenyl, halo, or cyano; and X is halo;
   a second part comprising a cationically polymerizable material and a second latent curing component which is reactive with said first component to form cations which are curingly effective for said cationically polymerizable material.

5. A composition according to claim 4, wherein X is selected from the group consisting of bromine and iodine.

6. A two-part composition curable by contact of respective parts with one another, comprising:
   a first part comprising a cationically polymerizable material and as a first latent curing component as organic halide of the formula:

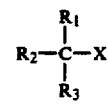

wherein:
   $R_1$, $R_2$, and $R_3$ may be the same or different and each independently is selected from the group consisting of: —H, —CH$_3$, $C_6H_5$—,

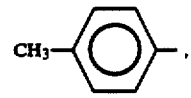

and $CH_2$=CH—, which may optionally be substituted with halo, alkyl, or haloalkyl; and
   X is halo;
   a second part comprising a cationically polymerizable material and a second latent curing component which is reactive with said first component to form cations which are curingly effective for said cationically polymerizable material.

7. A two-part composition curable by contact of respective parts with one another, comprising:
   a first part comprising a cationically polymerizable material and as a first latent curing component an organic halide selected from the group consisting of dibromoxylene and iodobutane;
   a second part comprising a cationically polmerizable material and a second latent curing component which is reactive with said first component to form cations which are curingly effective for said cationically polymerizable material.

8. A composition according to claim 1, wherein said cationically polymerizable material is selected from the group consisting of: oxiranes, styryloxy compounds;

vinyl ethers; N-vinyl compounds; ethylenically unsaturated hydrocarbons; cyclic formals and cyclic organosiloxanes.

9. A composition according to claim 1, wherein said cationically polymerizable material in each of said first and second parts is an oxirane functional resin.

10. A composition according to claim 9, wherein the oxirane functional resin in each of said first and second parts is the same and is selected from the group consisting of cycloaliphatic epoxies, epoxidized novolacs, diglycidyl ethers of bisphenol-A, and extended prepolymers of diglycidyl ethers of bisphenol-A.

11. A composition according to claim 9, wherein the oxirane functional resin in each of said first and second parts contains at least one cyclohexene oxide group per molecule.

12. A composition according to claim 11, wherein said oxirane functional resin comprises an epoxycyclohexane carboxylate resin.

13. A composition according to claim 9, wherein the oxirane functional resin is selected from the group consisting of 3,4-epoxycyclohexylmethyl-3,4-epoxycyclohexanecarboxylate; bis (3,4-epoxy-6-methylcyclohexyl-methyl) adipate; 3,4-epoxy-2-methylcyclohexylmethyl-3,4-epoxy-2-methylcyclohexane carboxylate; vinyl cyclohexene dioxide; and 2,(3,4-epoxycyclohexyl-5-5,-spiro-3,4-epoxy) cyclohexane metadioxane.

14. A composition according to claim 1, wherein the cationically polymerizable material in said first part is the same as the cationically polymerizable material in said second part and wherein the concentration of cationically polymerizable material in said first part is equal to concentration of the cationically polymerizable material in the second part, whereby cross-diffusional concentration driving forces of the first and second components are maximized in the composition.

15. A composition according to claim 1, further comprising in said first part a solvent for said first component, and in said second part a solvent for said second component.

16. A composition according to claim 15, wherein the solvent in each of said first and second parts is nonvolatile, non-nucleophilic and substantially moisture free.

17. A composition according to claim 15, wherein the solvent in each of said first and second parts is selected from the group consisting of anhydrous ethanol, tetrahydrofuran, and nitromethane.

18. A composition according to claim 15, wherein the solvent in said first part has a concentration of from about 1 to about 4 times the concentration of said first component, and the solvent in said second part has a concentration of from about 1 to about 4 times the concentration of said second component.

19. A composition according to claim 1, wherein each of the first and second components has a concentration of from about 0.05 to about 10% by weight, based on the total weight of the composition.

20. A composition according to claim 1, wherein each of the first and second components has a concentration of from about 1.0 to about 5.0 percent by weight, based on the total weight of the composition.

21. A two-part composition curable by contact of respective parts with one another, comprising:
a first part comprising an oxirane functional resin and an organic halide of the formula:

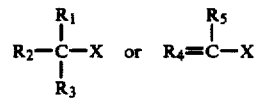

wherein:
$R_1$, $R_2$, $R_3$ and $R_5$ may be the same or different and each independently is selected from H, halo, alkyl, aryl, aralkyl, alkaryl, and alkenyl, which may optionally be substituted by alkyl, alkenyl, halo, or cyano;
$R_4$ is selected from alkylidene, aralkylidene, and alkenylidene, which may optionally be substituted by alkyl, alkenyl, halo, or cyano; and
X is halo; and
a second part comprising an oxirane functional resin and a compound which is reactive with the organic halide to form cations which are curingly effective for said resin.

22. A two-part composition curable by contact of respective parts with one another, comprising:
a first part comprising an oxirane functional resin and an organic halide; and
a second part comprising an oxirane functional resin and a silver salt of a non-nucleophilic anion.

23. A method of forming a cured composition from the two-part composition of claim 1, comprising contacting said first part and said second part with one another.

24. A method of bonding matable surfaces to one another, wherein said first part of said two-part composition of claim 1 is applied to a first matable surface and said second part thereof is applied to a second matable surface, and said first and second matable surfaces are mated to contact the respective first and second parts applied thereto.

25. A cured composition formed from the two-part composition of claim 1 by contacting said first part and said second part with one another.

* * * * *

UNITED STATES PATENT AND TRADEMARK OFFICE
CERTIFICATE OF CORRECTION

PATENT NO. : 4,717,440
DATED : January 5, 1988
INVENTOR(S) : Kieran F. Drain and David J. Dunn It is certified that error appears in the above-identified patent and that said Letters Patent is hereby corrected as shown below:

In the Abstract, line 13, change "," (second instance) to --.--.

Column 2, line 68, change "h" to --H--.

Column 6, lines 25-29, that portion of the right-hand formula reading

"$R_4$-C-" should read --$R_4$=C- --.

Column 9, line 2, change "resine" to --resin--.

Column 14, line 28, change "as" (second instance) to --an--.

Signed and Sealed this

Seventh Day of June, 1988

*Attest:*

DONALD J. QUIGG

*Attesting Officer*     *Commissioner of Patents and Trademarks*